United States Patent
Ando (10) Patent No.: US 8,164,214 B2
(45) Date of Patent: Apr. 24, 2012

(54) VEHICLE CONTROL APPARATUS HAVING FUNCTION FOR PREVENTING ERRONEOUS OPERATION DUE TO DELAY IN ACTIVATION OF OTHER VEHICLE CONTROL APPARATUS

(75) Inventor: Katsuyuki Ando, Kasugai (JP)

(73) Assignee: Denso Corporation, Kariya (JP)

( * ) Notice: Subject to any disclaimer, the term of this patent is extended or adjusted under 35 U.S.C. 154(b) by 1123 days.

(21) Appl. No.: 11/401,301

(22) Filed: Apr. 11, 2006

(65) Prior Publication Data

US 2006/0226702 A1  Oct. 12, 2006

(30) Foreign Application Priority Data

Apr. 11, 2005  (JP) .................................. 2005-113390

(51) Int. Cl.
*B60L 1/00* (2006.01)
*B60L 3/00* (2006.01)
*H02G 3/00* (2006.01)

(52) U.S. Cl. ........................................................ 307/9.1
(58) Field of Classification Search .................. 307/9.1, 307/10.1
See application file for complete search history.

(56) References Cited

U.S. PATENT DOCUMENTS

| 5,467,277 | A | 11/1995 | Fujisawa et al. | |
|---|---|---|---|---|
| 5,587,957 | A | 12/1996 | Kowalczyk et al. | |
| 5,629,941 | A | 5/1997 | Kawanishi et al. | |
| 5,739,761 | A * | 4/1998 | Kobayashi | 701/35 |
| 6,459,967 | B1 | 10/2002 | Otto | |
| 6,662,094 | B2 * | 12/2003 | Murphy et al. | 701/45 |
| 2005/0210326 | A1 | 9/2005 | Nishimura et al. | |

FOREIGN PATENT DOCUMENTS

| DE | 198 39 193 A1 | 3/2000 |
|---|---|---|
| EP | 0272877 A2 | 12/1987 |
| EP | 0272877 A3 | 12/1987 |
| EP | 0911220 A2 | 10/1998 |
| JP | 6-30005 | 2/1994 |
| JP | 6-135101 | 5/1994 |
| JP | 07-226980 | 8/1995 |
| JP | 08-008924 | 1/1996 |
| JP | 08-276800 | 10/1996 |
| JP | 10-63542 | 3/1998 |
| JP | 2002-314632 | 10/2002 |
| JP | 2004-104253 | 4/2004 |
| JP | 2005-250854 | 9/2005 |

OTHER PUBLICATIONS

Extended EPO Search Report dated May 31, 2007.
Office Action dated Apr. 6, 2010 issued in corresponding Japanese Application No. 2005-113390 with an at least partial English-language translation thereof.

* cited by examiner

*Primary Examiner* — Jared Fureman
*Assistant Examiner* — Carlos Amaya
(74) *Attorney, Agent, or Firm* — Nixon & Vanderhye P.C.

(57) ABSTRACT

In a control system in which a first vehicle control apparatus becomes activated prior to activation of a second vehicle control apparatus, and is coupled for communication with the second vehicle control apparatus and has a storage medium for storing data received from the second vehicle control apparatus, the first vehicle control apparatus inhibits processing using data stored in the storage medium, during a delay interval that precedes activation of the second vehicle control apparatus.

24 Claims, 3 Drawing Sheets

VEHICLE CONTROL APPARATUS HAVING FUNCTION FOR PREVENTING ERRONEOUS OPERATION DUE TO DELAY IN ACTIVATION OF OTHER VEHICLE CONTROL APPARATUS

CROSS-REFERENCE TO RELATED APPLICATIONS

This application is based on and incorporates herein by reference Japanese Patent Application No. 2005-113390 filed on Apr. 11, 2005.

BACKGROUND OF THE INVENTION

1. Field of Application

The present invention relates to a vehicle control apparatus for use in a control system of a vehicle in which a plurality of vehicle control apparatuses have respective communication apparatuses for mutual communication. In particular, the invention relates to a vehicle control apparatus used in a vehicle in which two or more of the vehicle control apparatuses become activated at respectively different time points, e.g., by a system such as a wake-up system.

2. Description of Related Art

Present-day motor vehicles are equipped with various control apparatuses for controlling equipment of the vehicle, such as an engine ECM (engine control module), alternator ECU 2 (electronic control unit), transmission ECU, etc., with data communication being performed between the various control apparatuses. The respective time points at which these control apparatuses become activated (specifically, become capable of beginning communication, after power commences to be supplied to the control apparatus) are not necessarily identical. For example the case will be considered in which a vehicle control apparatus A receives data transmitted from a vehicle control apparatus B, but the activation time point of the vehicle control apparatus A is prior to that of the vehicle control apparatus B. It will further be assumed that the vehicle control apparatus A has a buffer having a region that is reserved for holding data received from the vehicle control apparatus B, with that data being used in processing executed by vehicle control apparatus A.

In such a case, there will be a delay interval during which the vehicle control apparatus A is activated but the vehicle control apparatus B is not yet activated. This can result in the following problems. The contents of the aforementioned buffer of the vehicle control apparatus A, during the activation delay interval, will in general not constitute data that have been recently received from the vehicle control apparatus B. Hence use of the buffer contents in processing that is executed by vehicle control apparatus A may result in faulty operation by the vehicle control apparatus A, so that appropriate control cannot be achieved.

A further problem that may result from the activation delay interval is that the vehicle control apparatus A may judge that the amount of data stored in the buffer (specifically, a region used to hold data received from the vehicle control apparatus B) is incorrect, and may thereby wrongly judge that a failure condition has occurred (i.e., a failure condition of the vehicle control apparatus B, or a failure in communication with the vehicle control apparatus B), whereas the problem is caused only by the delay in activating the vehicle control apparatus B.

This problem is especially liable to occur in the case of a vehicle using a wake-up system for activating various vehicle control apparatuses, so that some vehicle control apparatuses are activated prior to switch-on of the vehicle main power source (i.e., ignition switch-on) and other vehicle control apparatuses become activated after that switch-on has occurred.

SUMMARY OF THE INVENTION

It is an objective of the present invention to overcome the above problems, by providing a vehicle control apparatus that receives data from another vehicle control apparatus which is activated at a time point subsequent to an activation time point of the first-mentioned vehicle control apparatus, wherein during an activation delay interval, the first-mentioned vehicle control apparatus has been activated but the other vehicle control apparatus has not yet been activated, but whereby the possibility of erroneous operation due to non-reception of data from the other control apparatus during that activation delay interval can be reduced.

To achieve the above objective, the invention provides a first vehicle control apparatus (1) having a communication circuit (11) for communicating with a second vehicle control apparatus (2) whose activation time point is delayed with respect to the activation time point of the first vehicle control apparatus (1), with the first vehicle control apparatus (1) having a storage medium (11a) for storing data received from the second vehicle control apparatus (2) via the communication circuit, and having a control circuit (13) which inhibits processing that uses data held in the storage medium (11a), during a delay interval between a time point of activation of the first vehicle control apparatus and a specific subsequent time point that occurs no later than the time point of activation of the second vehicle control apparatus.

As a result it can be ensured that data held in the storage medium, during the activation delay interval, which have not actually been received from the second vehicle control apparatus, will not be used in processing by the first vehicle control apparatus. The possibility of defective operation can thereby be reduced.

The activation delay interval may be measured as the interval that elapses, following activation of the first vehicle control apparatus, until switch-on of the main power supply of the vehicle. In that case, the invention can be advantageously be applied to a system such as a wake-up system, in which some vehicle control apparatuses are activated prior to switch-on of the main power supply of the vehicle, and other vehicle control apparatuses are activated at switch-on of that main power supply.

In some cases, the second vehicle control apparatus may become activated subsequent to switch-on of the main power supply of the vehicle. In that case, the control circuit of the first vehicle control apparatus (i.e., a vehicle control apparatus according to the present invention, which is activated prior to that switch-on) can be configured to inhibit the use (in processing) of data held in the aforementioned dedicated storage medium, during the time interval that elapses from activation of the first vehicle control apparatus until a predetermined interval has elapsed following switch-on of the main power supply of the vehicle. Switch-on of the main power supply is thereby used as a reference time point. As a further alternative, the control circuit of the vehicle first control apparatus can be configured to inhibit processing of data held in the aforementioned dedicated storage medium, during the delay interval that elapses from activation of that vehicle control apparatus until the point at which data begin to be received from the second vehicle control apparatus.

The processing that is inhibited from being performed using data held in the storage medium during an activation delay interval may for example be failure detection processing. In that case, it becomes possible to reduce the possibility that a failure condition will be erroneously detected due to non-valid data being held in the storage medium during the activation delay interval.

The aforementioned second vehicle control apparatus may be configured to transmit data only in response to a data transmission request, with the data being transmitted to the source of the data transmission request. In that case, the first vehicle control apparatus can be configured to inhibit sending of a data transmission request to the second vehicle control apparatus during the activation delay interval.

In that way, unnecessary transmitting of data transmission requests can be avoided.

From another aspect, the invention provides a first vehicle control apparatus (1) having a communication circuit (11) for communicating with a second vehicle control apparatus (2) whose activation time point is delayed with respect to the activation time point of the first vehicle control apparatus (1), with the first vehicle control apparatus (1) having a storage medium (11a) dedicated to storing data received from the second vehicle control apparatus (2) via the communication circuit, and having a control circuit (13) which comprises:

(a) interval judgement means for judging when a current time point is within a time interval that extends from an activation time point of the first vehicle control apparatus up to a time point occurring no later than a subsequent activation time point of the second vehicle control apparatus, and (b) inhibit means operating in accordance with judgement results produced by the interval judgement means, for selectively inhibiting processing that utilizes contents of the dedicated storage medium;

with the respective functions of the interval judgement means and the inhibit means being implemented by executing a computer program.

DESCRIPTION OF PREFERRED EMBODIMENTS

Figure 1:
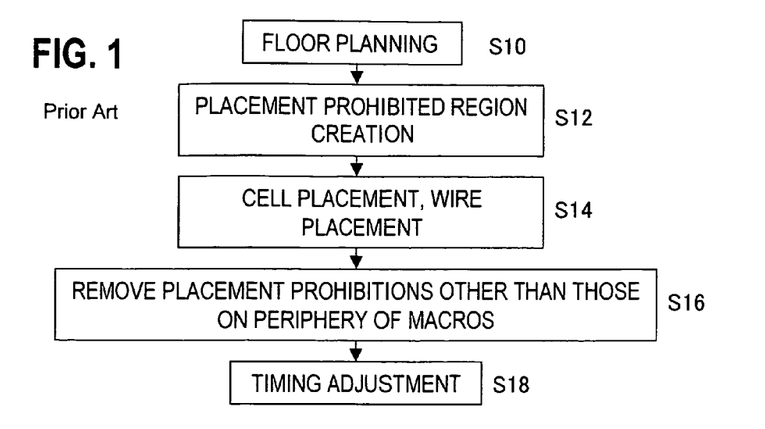
FIG. 1 is a general system block diagram showing a vehicle control apparatus embodiment which is an ECM, connected to other equipment of a vehicle.

FIG. 1 is a general system block diagram showing part of a vehicle control apparatus, specifically an ECM 1 which controls the vehicle engine. As shown, the ECM 1 is connected for communication with a alternator ECU 2, and meter ECU, via a LIN (Local Internet Network). Electronic devices that are connected to such an LIN operate either as a master device or as a slave device, with the slave devices receiving data transmission requests from a master device and transmitting the requested data to the source of the data transmission request. With this embodiment, the ECM 1 is a master device, while the alternator ECU 2 and meter ECU are respective slave devices.

The alternator ECU 2 transmits data including the level of supply voltage and level of supply current being generated by the alternator, to the ECM 1, in response to data transmission requests received from the ECM 1 that are directed to the alternator ECU 2. Similarly, the meter ECU transmits data including the vehicle speed and the distance traveled, to the ECM 1, in response to data transmission requests received from the ECM 1 that are directed to the meter ECU.

In addition, the ECM 1 is connected to a door unit 4 which detects opening or closing of a door of the vehicle, and to the ignition switch 5 of the vehicle. When the door unit 4 detects that a vehicle door has become opened, it transmits to the ECM 1 an indication signal referred to in the following as a wake-up signal, at a level referred to herein as the ON level, with the wake-up signal being generated at the ON level during a predetermined interval and thereafter held at an off level.

The ECM 1 further receives sensor signals from sensors 6, which includes an engine crankshaft angle sensor, an engine coolant temperature sensor, etc., and transmits control signals to actuators 7, which include the fuel pump, fuel igniters, etc.

The ECM 1 further exchanges data with various ECUs that control the vehicle operation, including a brake ECU, transmission ECU, etc, via a CAN (Controller Area Network).

The ECM 1 includes a SCI (Serial Communication Interface) 11, a CAN driver 12, and a control circuit 13, which in this embodiment is a microcomputer that operates from stored programs. The SCI 11 includes a buffer 11a and a receiving flag 11b, and converts data supplied from the control circuit 13 into suitable form for serial data transmission via the LIN, with the resultant converted data being transmitted at appropriate timings to the alternator ECU 2 or the meter ECU. When the SCI 11 receives data transmitted from the alternator ECU 2 or meter ECU, it stores the data in the buffer 11a (more specifically, in a predetermined region of the buffer 11a), and sets the receiving flag 11b to the ON state. When the SCI 11 subsequently reads out the data stored in the buffer 11a, it resets the receiving flag 11b to the OFF state.

It would be equally possible to provide respectively different buffers, each with a corresponding receiving flag, for data received from various sources. For example, one buffer and a corresponding receiving flag could be provided for data received from the alternator ECU 2, and a second buffer and corresponding receiving flag, for data received from the meter ECU.

The CAN driver 12 converts data produced from the control circuit 13 into suitable form for CAN communication, and outputs the converted data to the CAN. The CAN driver 12 also receives data transmitted via the CAN from other devices, and converts the data into a form that can be interpreted by the control circuit 13, then supplies the converted data to the control circuit 13.

The control circuit 13 includes a CPU 13a, a RAM 13b, a ROM 13c and an EEPROM 13d, as well as input/output circuits, etc., (not shown in the drawings). The CPU 13a executes programs that are held stored in the ROM 13c, to perform operations based on signals and data from the door unit 4, the ignition switch 5, the sensors 6, the SCI 11 and the CAN driver 12, and also (based on these operations) outputs data and signal to the alternator ECU 2, the meter ECU, the CAN driver 12 and the actuators 7.

The ECM 1 becomes activated when the wake-up signal changes from the off to the ON state, and similarly the meter ECU becomes activated when the wake-up signal changes from the off to the ON state. The alternator ECU 2 becomes activated when the ignition switch 5 is changed to the IG (ignition) position, with a corresponding signal (referred to in the following as the IG signal) which is supplied from the ignition switch 5 to the control circuit 13 being thereby changed from the off to the ON state.

Figure 2:
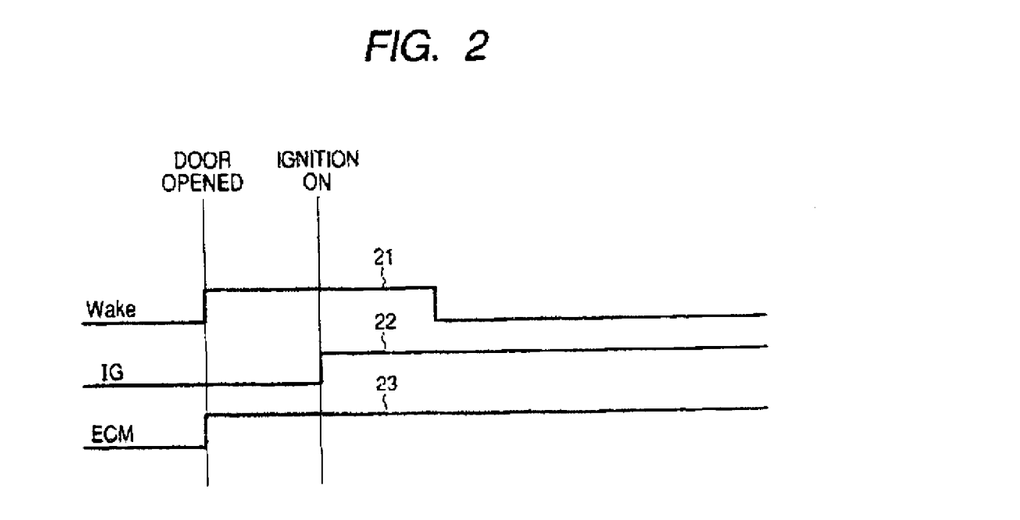
FIG. 2 is a timing diagram for describing the operation of the above embodiment.
Figure 2A:
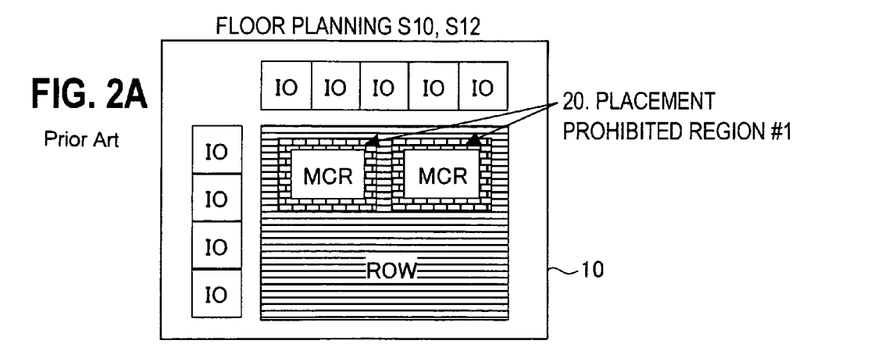
Figure 2B:
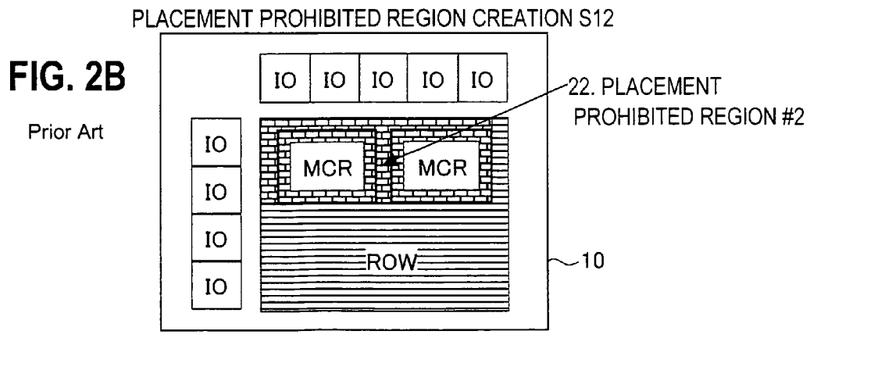

FIG. 2 is a timing diagram showing an example of different activation timings of vehicle control apparatuses, with numeral 21 designating the wake-up signal (with the ON and OFF states respectively indicated as high and low levels), numeral 21 designating the IG signal, i.e., the ignition ON and OFF conditions (respectively indicated as high and low levels), and numeral 23 indicates the operating condition of the ECM 1, with the activated condition and non-activated condition being indicated as high and low levels respectively. As shown in FIG. 2, when a vehicle door is opened while the ignition is off and the ECM 1 is inactivated, the wake-up signal goes ON, and subsequently goes off after a predetermined time interval. When the wake-up signal goes from off to ON, the ECM 1 becomes activated, and subsequently when the ignition is switched on, the IG signal goes from the OFF to ON level and thereafter remains at that level.

The duration for which the wake-up signal remains at the ON level is set to a value such as 5 minutes, which (on average) is a sufficient length of time for the vehicle driver to enter the opened door and then switch on the ignition. It can thereby be ensured that the IG signal goes to the ON state while the wake-up signal is at the ON state.

Hence with this vehicle control system, utilizing a wake-up system, there are some vehicle control apparatuses (specifically, the ECM 1 and the meter ECU) which become activated prior to ignition switch-on, and other vehicle control apparatuses such as the alternator ECU 2 which become activated when (or soon after) ignition switch-on occurs. Such a system is referred to as a wake-up system.

The reason for utilizing such a wake-up system is that it is advantageous to activate certain devices prior to ignition switch-on. For example, by activating the ECM 1 before the ignition is switched on, the ECM 1 can control the fuel pump to increase the ignition pressure as far as possible, thereby reducing the level of exhaust pollutant emissions from the vehicle engine immediately after engine starting.

The interval between the opening of a door and the point of ignition switch-on, with this embodiment, will be referred to in the following as a non-communication interval. During that interval, the alternator ECU 2 remains inactivated, irrespective of whether the ECM 1 is activated. Hence, during that non-communication interval, even if the ECM 1 transmits a data transmission request to the alternator ECU 2, no data will be transmitted by the alternator ECU 2 in response. Thus, during the non-communication interval, the aforementioned part of the buffer 11a which is used to store data received from the alternator ECU 2 may contain non-valid data, i.e., which have not been actually received from the alternator ECU 2 and may be entirely unsuitable for use as received data by the control circuit 13.

However with this embodiment, during the non-communication interval, the CPU 13a inhibits any processing that would utilize data currently held in the buffer 11a and that would normally be expected to be data received from the alternator ECU 2 (e.g., that are held in the region of the buffer 11a used for data from the alternator ECU 2). To perform this inhibiting function, the CPU 13a repetitively executes the programs 200 and 300 shown in FIGS. 3 and 4 respectively, after it has become activated (for example with a repetition period of 0.1 second).

Figure 3:
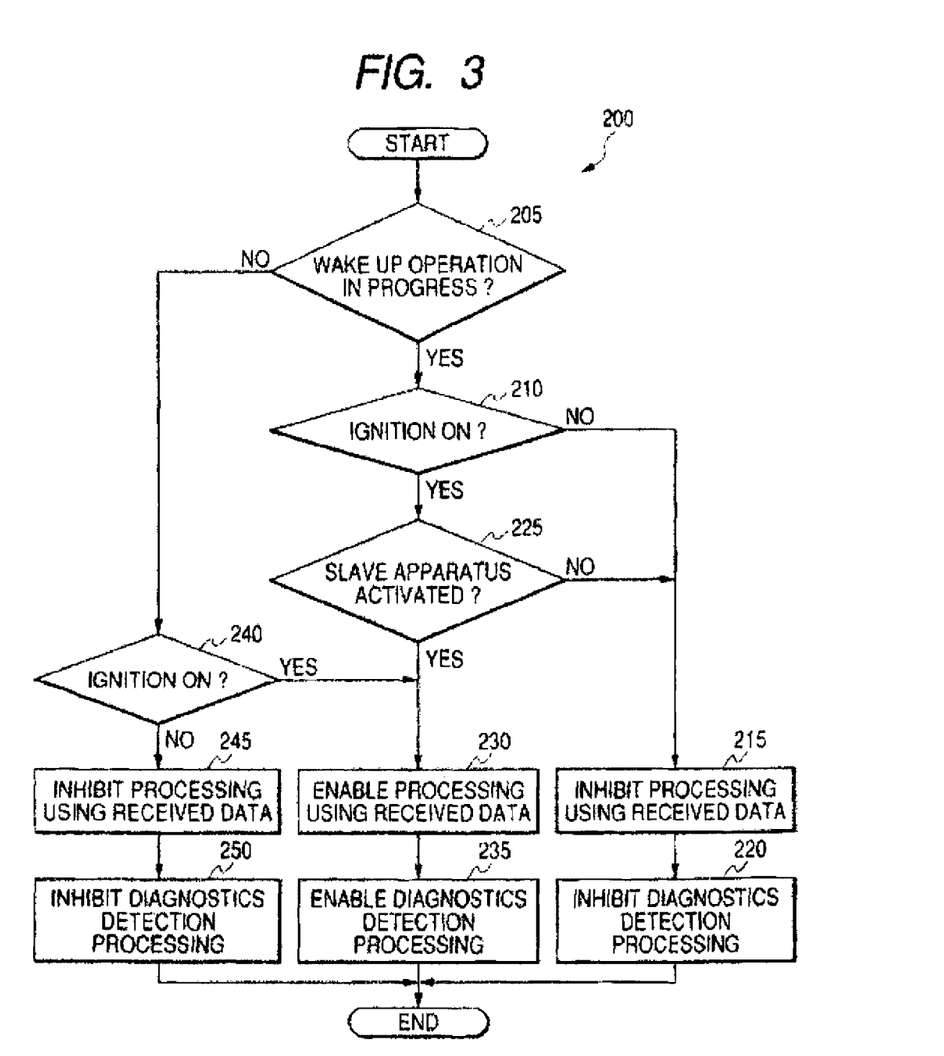
FIGS. 3 and 4 are respective flow diagrams of programs that are executed by a CPU of the embodiment.
Figure 3A:
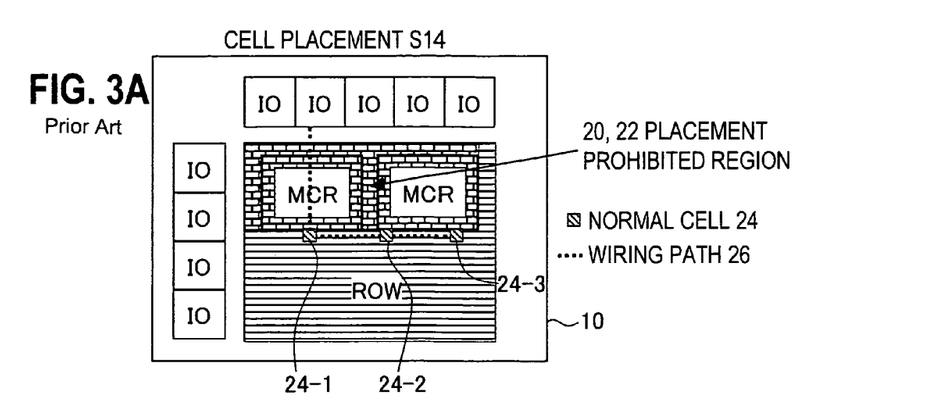
Figure 3B:
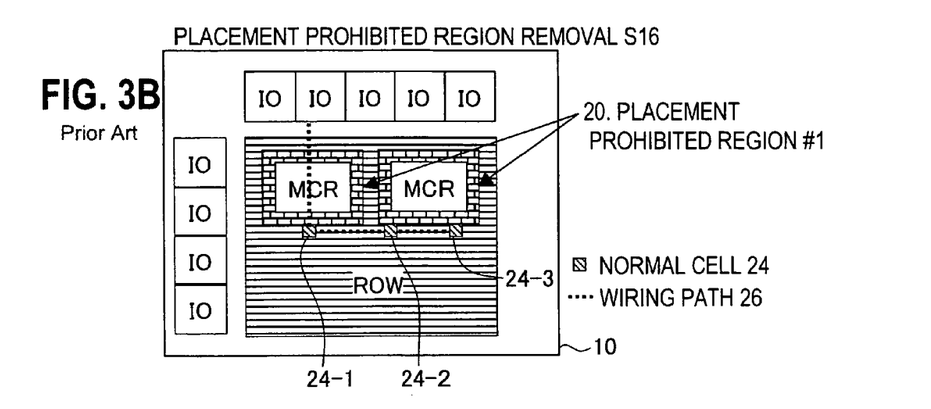
Figure 3C:
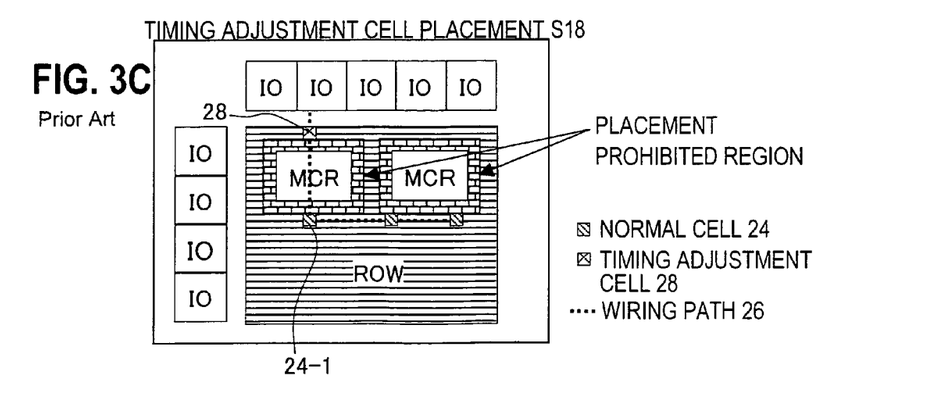

Before starting to execute these programs, when the CPU 13a becomes activated, it first performs initialization processing to set initial values for various variables into the RAM 13b. In executing the program 200, the CPU 13a first judges whether the wake-up signal 21 is being received in the ON state from the door unit 4 (step 205). When the wake-up signal is in the ON state, this is taken as indicating that wake-up control is in progress. If it is found in step 205 that wake-up control is in progress, then step 210 is executed, while if wake-up control is not in progress, step 240 is executed.

In step 210, a decision is made as to whether the IG signal is at the ON level, indicating that the ignition has been switched on. If the IG signal is ON, then step 225 is executed, while if it is OFF, step 215 is executed.

In step 215, received signal interrupt inhibit processing is executed. Specifically, a received signal interrupt inhibit flag (implemented in the RAM 13b) is set to the ON state. Next in step 220, diagnostics detection inhibit processing is executed. Specifically, a diagnostics detection inhibit flag (implemented in the RAM 13b) is set to the ON state. Execution of step 215 completes this execution of the program 200.

In step 225, a decision is made as to whether the slave device (i.e., the alternator ECU 2) is activated. The alternator ECU 2 becomes activated when it becomes supplied with operating power, following ignition switch-on. That is to say, the activation timing for the alternator ECU 2 (i.e., the time point at which communication with the alternator ECU 2 becomes possible) is delayed by a certain amount such as 3 seconds from the time point of ignition switch-on. The judgement as to whether the alternator ECU 2 is currently activated can for example be made based upon whether or not a reference value of time interval has elapsed from the point of ignition switch-on. Alternatively, the judgement can made based upon whether data are beginning to be received by the SCI 11 from the alternator ECU 2.

If the judgement as to whether the alternator ECU 2 is currently activated is made based upon whether a reference value of time interval has elapsed from the point of ignition switch-on, that interval value can be a fixed value that is held stored in the ROM 13c. Alternatively, the time interval value can be made variable, in accordance with certain conditions. As a further alternative, the reference time interval value can be randomly selected from a limited range of values. However the reference time interval value should be made longer than the interval that elapses from ignition switch-on until actual activation of the alternator ECU 2 will occur.

If the judgement as to whether the alternator ECU 2 is currently activated is made based upon whether data are beginning to be received by the SCI 11 from the alternator ECU 2, then the value of the receiving flag 11b is utilized. That is to say, during each execution of step 225:

(a) the SCI 11 is used to send a data transmission request to the alternator ECU 2, (b) a check is then made as to whether the receiving flag 11b has gone to the ON state (as a result of data being transmitted from the alternator ECU 2 in response to the data transmission request).

(c) if the receiving flag 11b is ON, then it is judged that the alternator ECU 2 has been activated, so that a YES decision is reached, while otherwise, a NO decision is reached.

If it is judged in step 225 that the alternator ECU 2 is activated, then step 230 is executed, while if it is judged that the alternator ECU 2 is not activated, then step 230 is executed.

In step 230, received signal interrupt enable processing is executed. Specifically, the received signal interrupt inhibit flag is set to the OFF state. While that flag is OFF, the control circuit 13 inhibits processing of data using the contents of the alternator-use buffer region. Next in step 235, diagnostics enabling interrupt processing is executed. Specifically, the diagnostics detection interrupt inhibit flag is set to the OFF state. While that flag is OFF, the control circuit 13 inhibits execution of diagnostics detection processing that is based on the contents of the alternator-use buffer. Completion of step 235 ends this execution of program 200.

Although omitted from the drawings for simplicity of description, when a YES decision is first reached in an execution of step 225, a "slave device activated" flag (which is reset to the OFF state during initialization processing) is set to the ON state. That flag is tested prior to executing step 225 and if it is ON, then step 235 is directly executed. In that way, when program 200 is executed after a YES decision has been previously reached in step 225 and the receiving flag 11b has been thereafter reset to the OFF state, it will be continuously judged that the alternator ECU 2 is in the activated state (until switch-off of the ignition occurs), i.e., irrespective of changes in the state of the receiving flag 11b.

In step 240 a decision is made as to whether the ignition is currently switched on, i.e., based on whether the IG signal is at the ON level. If the IG signal is ON, step 230 is executed, while if not on, operation proceeds to step 245, in which the same processing as for step 215 is executed, with received signal interrupt inhibit processing being performed. Next in step 250, the same processing as for step 220 is executed, with diagnostics detection inhibit processing being performed. This completes this execution of the program 200.

In addition to the program 200, the CPU 13a performs calculations based on the data received from the alternator ECU 2 and detection results received from the sensors 6, i.e., for calculating the engine ignition timings, fuel injection timings, fuel pump control information, etc. Based on the results of these calculations, a plurality of control programs are repetitively executed for controlling the actuators 7.

In executing these control programs, changeover is performed, in accordance with whether the received signal interrupt inhibit flag is in the ON or the OFF state, between utilizing and not utilizing data that are currently held in the region within the buffer 11a that is used to store data received from the alternator ECU 2. That buffer region is referred to in the following as the alternator-use buffer region.

Specifically, when the data held in the alternator-use buffer region are to be utilized, a data transmission request is transmitted to the alternator ECU 2, using the SCI 11, during execution of a control program. The data that are thereafter held in the alternator-use buffer region are then applied to overwrite data constituting respective values for a set of variables allocated to the alternator ECU 2, referred to in the following as the alternator-use variables, that are held in the RAM 13b. The values for these variables are used in calculating the contents of control data.

Specific examples of methods of inhibiting use of the contents of the alternator-use buffer region for control processing, during a non-communication interval, are:

(a) performing control processing after changing over to use of replacement values, in place of the data held in the alternator-use buffer region; or (b) omitting to perform the control processing itself.

With method (a) above, initial values which are stored as the alternator-use variables during initialization processing (at the time of activation of the ECM 1) can be utilized as the replacement values. These initial values for the variables are not necessarily values that have been previously transmitted as data from the alternator ECU 2, but should be of similar type to the values that are transmitted as data from the alternator ECU 2 during normal operation. This will reduce the possibility that excessively unsuitable results are obtained from calculations that utilize the variable values. Alternatively, the replacement values can be values (i.e., for voltage and current of the alternator ECU 2) that are estimated based on detection values from the sensors 6, or data received via the CAN.

With method (b) above, the values held in the alternator-use buffer region may or may not be overwritten to replace the values of the alternator-use variables. Moreover that method may be implemented such that (during the non-communication interval) control calculations are executed, but control of the actuators 7 is not performed. That is to say, the essential point is that the actuators 7 will not be controlled based on values that are held in the alternator-use buffer region during the non-communication interval.

In addition, the CPU 13a repetitively executes a diagnostics program for judging whether or not there is a failure condition of the alternator ECU 2 or a failure of communication with the alternator ECU 2 and for storing the judgement results in the EEPROM 13d, and for outputting the judgement results to a diagnostics computer via the CAN.

In executing the diagnostics program, changeover is performed between using and not using (for the purpose of failure detection) the contents of the alternator-use buffer region, with the changeover performed in accordance with whether the aforementioned diagnostics detection inhibit flag is in the ON or the OFF state.

When the data held in the alternator-use buffer region are used for the purpose of failure detection when executing the diagnostics program, the SCI 11 is used to transmit a data transmission request to the alternator ECU 2, and the resultant data that thereby become stored in the alternator-use buffer region are used to overwrite the stored values of the alternator-use variables in the RAM 13b. These overwritten values for the variables are then used as a basis for judging various types of failure condition.

One method of inhibiting use of the data held in the alternator-use buffer region (during the non-communication interval) for failure detection processing is to omit performing judgement as to whether there is a failure condition, based on these data. Alternatively, the failure judgement can be performed based on initial values of the alternator-use variables, set in RAM at the time of initialization described above, in place of using the contents of the alternator-use buffer region.

As a further alternative, a method could be used whereby the contents of the alternator-use buffer region are used for the purpose of failure judgement, but the judgement results are not outputted. That is to say, irrespective of the method of failure diagnosis used during the non-communication interval, the essential point is that judgement results are not outputted which have been derived based upon data held in the alternator-use buffer region of the buffer 11a.

Through execution of the above program 200, the ECM 1 performs the following:

(1) while wake-up control is in progress (see step 205), (1-1) if the IG signal is OFF (see step 210) processing performed using values held in the alternator-use buffer region of the buffer 11a is inhibited (specifically, engine control processing, failure diagnostics processing) (see steps 215, 220), (1-2) even if the IG signal is ON (see step 210), if the slave device is not yet activated (see step 225), processing performed using values held in the alternator-use buffer region of the buffer 11a is inhibited (see steps 215, 220), (1-3) if the IG signal is ON (see step 210), and activation of the slave device has occurred (see step 225), the inhibiting of processing performed using values held in the alternator-use buffer region of the buffer 11a is released (see steps 230, 235).

Thus, during the non-communication interval (i.e., the interval corresponding to the case (1-1) above) in which the ECM 1 has been activated but the alternator ECU 2 has not yet become activated, the ECM 1 inhibits the use (in executing control processing or failure diagnostics processing) of data which are held in the alternator-use buffer region of the buffer 11a at that time, i.e., data that have not actually been received from the alternator ECU 2. Hence, the possibility of problems arising due to utilizing such data for control purposes can be substantially reduced. Similarly, the possibility of erroneous diagnosing failure of the alternator ECU 2, or erroneous diagnosing failure of communication with the alternator ECU 2, as a result of using non-valid data that are held in the alternator-use buffer region during the non-communication interval, can be substantially reduced.

Furthermore after engine switch-on has occurred (i.e., the IG signal has gone to the ON level, during the interval corresponding to case (1-2) above), the ECM 1 inhibits the use (in processing) of data held in the alternator-use buffer region of the buffer 11a, until activation of the alternator ECU 2 has actually occurred. As a result, although the activation of the alternator ECU 2 may occur after a delay following ignition switch-on, there is a reduced possibility of unsuitable processing being performed.

In addition, the ECM 1 performs the following:

(2) while wake-up control is in progress (see step 205), (2-1) if the IG signal is ON (see step 240), i.e., the engine is running, the ECM 1 releases the inhibit of using (in processing) the data held in the alternator-use buffer region of the buffer 11a (see steps 230, 235), (2-2) if the IG signal has been changed to OFF, i.e., this is a time point following switch-off of the ignition (see step 240), with the operation of the alternator ECU 2 having been halted while ECM 1 is activated, the ECM 1 inhibits use (in processing) of the data held in the alternator-use buffer region of the buffer 11a. Specifically, the data are inhibited from being used in engine control processing and in failure diagnostics processing (see step 245, 250).

Figure 4:
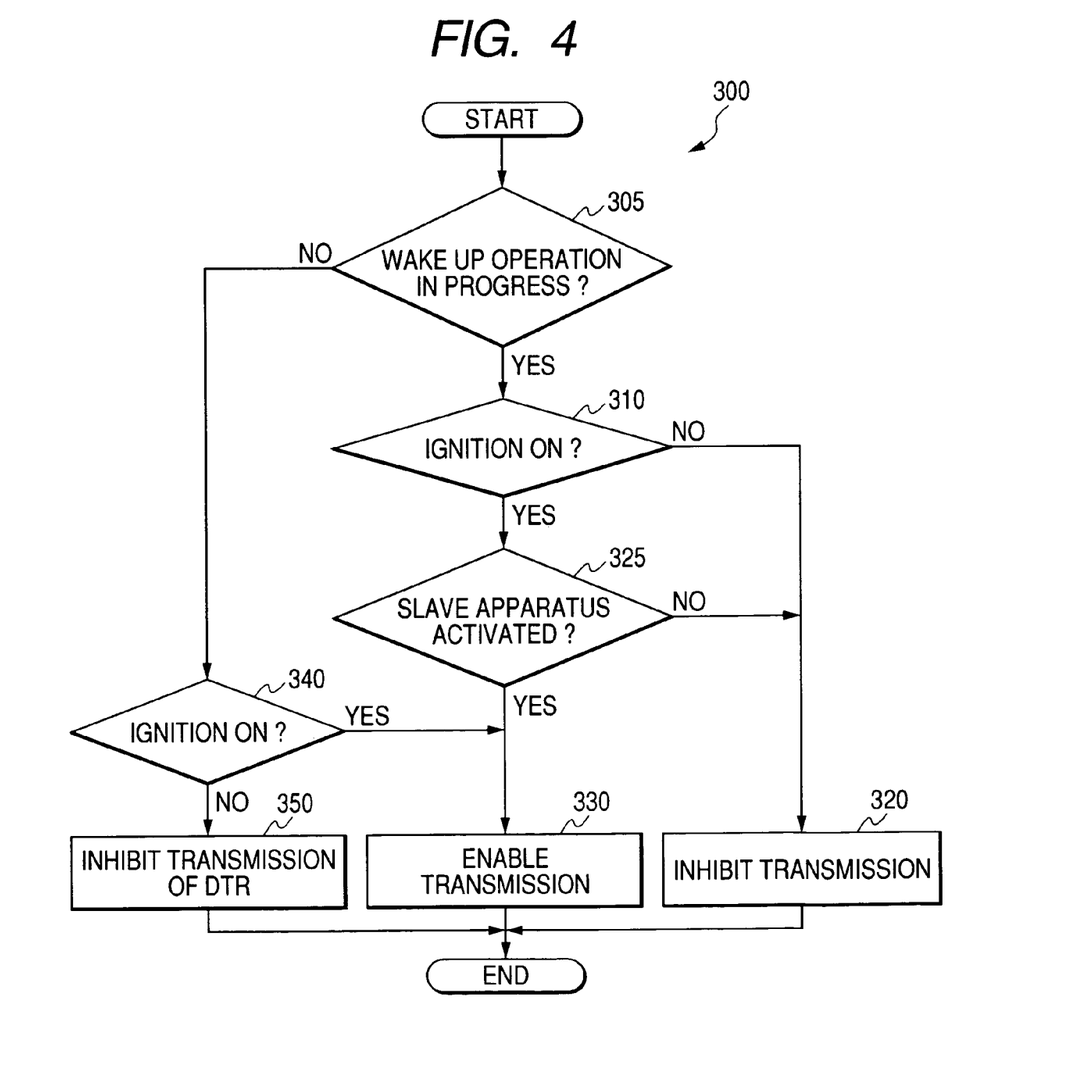

The program 300 shown in FIG. 4 selectively inhibits or enables the sending of data transmission requests to the alternator ECU 2. In executing program 300 the CPU 13a first performs the same processing as in step 205 of program 200, to judge whether wake-up control is in progress. If it is found that wake-up control is in progress, then step 310 is executed, while if wake-up control is not being performed, step 340 is executed. In step 310 a decision is made as to whether the ignition is currently switched on (IG signal is ON), and if so, step 325 is again executed, while if the ignition is off then step 320 is executed.

In step 320, transmission inhibit processing is executed. Specifically, a transmit inhibit flag (implemented in the RAM 13b) is set to ON state. Completion of step 320 ends this execution of program 300.

In step 325, the same processing is executed as in step 225, with a decision made as to whether the slave device is activated, and if it is found to be activated, step 330 is executed while if it is not activated, step 320 is executed.

In step 330, transmission permission processing is executed, i.e., the transmit inhibit flag is reset to the OFF state. Completion of step 335 ends this execution of program 300.

In step 340, a decision is made as to whether the ignition is currently on (i.e., the IG signal is at the ON level), and if so step 330 is executed, while if the ignition is OFF, step 350 is executed.

In step 350, the same processing is executed as in step 320, i.e., transmission inhibit processing is performed, and this execution of the program 300 then ends.

In executing the aforementioned plurality of control programs and diagnostics programs (but not the program 200, if that program involves transmitting a data transmission request in step 225 as described above), the CPU 13a determines whether or not to transmit a data transmission request to the alternator ECU 2 in accordance with the state of the transmission inhibit flag, i.e., when the transmission inhibit flag is ON, no data transmission request will be transmitted to the alternator ECU 2 by the ECM 1.

As a result of the program 300 being executed by the CPU 13a, the ECM 1 performs the following operations (3) when wake-up control is in progress (see step 305):

(3-1) when the IG signal is off (see step 310) sending of a data transmission request to the alternator ECU 2 is inhibited (see step 320), (3-2) if the IG signal is ON (see step 310) and the slave device (i.e., alternator ECU 2 is not yet activated (see step 325), sending of a data transmission request to the alternator ECU 2 is inhibited (see step 320), (3-3) if the IG signal is ON (see step 310) and the slave device is already activated (see step 325), the inhibiting of sending a data transmission request to the alternator ECU 2 is released (see step 330).

In the same way as described hereinabove for step 225 of program 200, after a YES decision is first reached in an execution of step 325, sending of data transmission requests is thereafter continuously enabled, until ignition switch-off occurs.

In that way, during the non-communication interval in which the ECM 1 has been activated but the alternator ECU 2 has not yet become activated, the ECM 1 inhibits sending of data transmission requests to the alternator ECU 2, so that sending of unnecessary data transmission requests (which would not actually be received by the destination device) is avoided.

Moreover, after the ignition has been switched on, the ECM 1 inhibits the sending of data transmission requests to the alternator ECU 2 during the interval (corresponding to the case (3-2) above) which elapses, following ignition switch-on, until the alternator ECU 2 becomes activated. This further serves to prevent the pointless sending of data transmission requests which cannot actually be received, during that interval until the alternator ECU 2 becomes activated.

In addition (4), after wake-up control has ended (see step 305):

(4-1) if the IG signal is ON (see step 340), i.e., the engine is running, the ECM 1 releases the inhibiting of sending data transmission requests to the alternator ECU 2 (see step 330), (4-2) if the IG signal is found to be off (see step 340), i.e., this is a condition in which the ECM 1 has been activated but the operation of the alternator ECU 2 has been halted, then the ECM 1 inhibits the transmission of data transmission requests to the alternator ECU 2 (see step 350).

The above embodiment is related to contents of the appended claims as follows. The alternator ECU 2 corresponds to the "second vehicle control apparatus", components of the SCI 11 other than the buffer 11a correspond to the "communication circuit means", the region of the buffer 11a in which data received from the alternator ECU 2 are held corresponds to the "storage medium", the functions of the CPU 13a in executing steps 205, 210, 225 of the program 200 corresponds to the "interval judgement means", the function of the CPU 13a in executing steps 215, 220, 230, 235 of the program 200 corresponds to the "inhibit means", the function of the CPU 13a in executing steps 305, 310, 325 of the program 300 corresponds to the "interval judgement means", while the function of the CPU 13a in executing steps 320 and 330 of the program 300 corresponds to the "inhibit means"

Other Embodiments

The present invention is not limited to the above embodiment, and various other embodiments or modifications could be envisaged, which fall within the scope of the appended claims.

For example, the ECM 1 is used in the above embodiment as an example of a vehicle control apparatus that is activated prior to activation of other vehicle control apparatuses. However the invention could be applied to a vehicle control apparatus other than an apparatus for engine control.

Moreover, it is not essential that the vehicle control apparatuses having respectively different activation timings be coupled for communication via a LIN as with the above embodiment, and communication via a CAN or other form of communication link could be utilized. Furthermore the invention is not limited in application to a wake-up system, but could be used in general with any system in which two or more control apparatuses have respectively different activation timings.

With the above embodiment, the ECM 1 inhibits processing that utilizes data that are currently held in the alternator-use buffer region of the buffer 11a, during the aforementioned non-communication interval in which it itself has been activated but the alternator ECU 2 has not yet been activated. In particular, failure diagnostics processing using these data is inhibited during the non-communication interval. However in addition, it would be possible to configure the ECM 1 to also inhibit use of the data held in the alternator-use buffer region of the buffer 11a during the non-communication interval, for the purpose of fail-safe processing. In fail-safe processing, safe replacement values are used in place of the data currently held in the alternator-use buffer region, when it is judged that these data are abnormal.

Moreover, it is not essential that the ECM 1 inhibits all processing that utilizes data currently held in the alternator-use buffer region of the buffer 11a, during the non-communication interval. For example during that interval, when no data are being received from the alternator ECU 2, it would be possible for the ECM 1 to inhibit processing of the data held in the alternator-use buffer region only when such processing might have a fatally adverse effect upon normal operation of the ECM 1.

Furthermore, in the processing of step 225 of the program 200, and step 325 of the program 300, it would be possible to make the judgement as to whether the alternator ECU 2 is activated based upon:

(a) whether a predetermined time interval has elapsed following ignition switch-on, or (b) whether data are beginning to be received from the alternator ECU 2, whichever of these events is the first to occur. That is to say, when either of these events occurs, it is judged that the alternator ECU 2 has become activated.

Alternatively, it would be possible to judge whether the ECM 1 has been activated but the alternator ECU 2 has not yet been activated, based only upon whether or not the wake-up signal is ON. As a further alternative, it would be possible to make that judgement based only upon whether the receiving flag 11b has been set to the ON state (for the first time after activation of the ECM 1). As a further alternative, it would be possible to make that judgement based only upon whether the ignition has become switched on (i.e., the IG signal has gone to the ON level).

Moreover, it is not essential that the ECM 1 inhibits processing using data from the alternator-use buffer region during the entirety of the non-communication interval, in which the ECM 1 itself has been activated but the alternator ECU 2 has not yet been activated. It would be equally possible for the ECM 1 to inhibit the use of that data only during a part of the non-communication interval.

With the above embodiment, the state of the IG signal (i.e., produced in accordance with whether the ignition switch has been set to the IG position) is used as an indication of whether the main power source of the vehicle is switched on. However it would be equally possible to use an ACC signal (i.e., produced in accordance with whether the ACC position of the ignition switch has been selected).

What is claimed is:

1. In a control system of a vehicle, a first vehicle control apparatus comprising a communication circuit that is coupled for data communication with a second vehicle control apparatus, and a storage medium for storing data received from said second vehicle control apparatus via said communication circuit, said second vehicle control apparatus being changed from an inoperative condition to an operative condition at an activation time point that is delayed with respect to an activation time point at which said first vehicle control apparatus becomes changed from an inoperative condition to an operative condition;

wherein said first vehicle control apparatus comprises control circuit means for inhibiting execution of processing that utilizes data stored in said storage medium, during a delay interval extending from said activation time point of said first vehicle control apparatus up to at least said activation time point of said second vehicle control apparatus.

2. A vehicle control system according to claim 1, wherein said first control circuit means inhibits said execution of processing that utilizes data stored in said storage medium, during a delay interval extending from said activation time point of said first vehicle control apparatus up to a time point of switch-on of a main power supply of said vehicle.

3. A vehicle control system according to claim 1, wherein said control circuit means inhibits said execution of processing that utilizes data stored in said storage medium, during a delay interval extending from said activation time point of said first vehicle control apparatus up to a time point that succeeds, by a predetermined reference duration, a time point of switch-on of a main power supply of said vehicle.

4. In a control system of a vehicle, a first vehicle control apparatus comprising a communication circuit that is coupled for data communication with a second vehicle control apparatus, and a storage medium for storing data received from said second vehicle control apparatus via said communication circuit, said second vehicle control apparatus being changed from an inoperative condition to an operative condition at an activation time point that is delayed with respect to an activation time point at which said first vehicle control apparatus becomes changed from an inoperative condition to an operative condition;

wherein said first vehicle control apparatus comprises control circuit means configured to inhibit execution of processing that utilizes data stored in said storage medium, during a delay interval extending from said activation time point of said first vehicle control apparatus up to a time point at which data begins to be received from said second vehicle control apparatus via said communication circuit.

5. A vehicle control system according to claim 4, wherein said second vehicle control apparatus is adapted to respond to a data transmission request by transmitting data to a source of said data transmission request, and wherein said first vehicle control apparatus repetitively transmits data transmission requests to said second vehicle control apparatus during said delay interval.

6. A vehicle control system according to claim 1, wherein said control circuit means inhibits execution of failure detection processing that utilizes data stored in said storage medium, during said delay interval.

7. A vehicle control system according to claim 1, wherein said second vehicle control apparatus is adapted to respond to receiving a data transmission request by transmitting data to a source of said data transmission request, and wherein said control circuit means inhibits transmitting of a data transmission request by said first vehicle control apparatus to said second vehicle control apparatus during said delay interval.

8. In a vehicle control system, a first vehicle control apparatus comprising a communication circuit that is coupled for data communication with a second vehicle control apparatus, a storage medium for storing data received from said second vehicle control apparatus via said communication circuit, and control circuit means, said second vehicle control apparatus being changed from an inoperative condition to an operative condition at an activation time point that is delayed with respect to an activation time point of said first vehicle control apparatus at which the first control apparatus becomes changed from an inoperative condition to an operative condition,
wherein said control circuit means comprises:
interval judgement means for judging whether a current time point is within a delay interval that extends from a time point of activation of said first vehicle control apparatus up to at least said activation time point of said second vehicle control apparatus, and
inhibit means operating based on judgement results produced by said interval judgement means for inhibiting processing that utilizes data stored in said storage medium, during said delay interval;
and wherein said first vehicle control apparatus implements respective functions of said interval judgement means and inhibit means by executing a program.

9. A vehicle control system according to claim 1, wherein said control circuit means inhibits said execution of processing that utilizes data stored in said storage medium, during a delay interval extending from said activation time point of said first vehicle control apparatus until a time point at which said second vehicle control apparatus has changed from an inoperative condition to a condition of being capable of communication with said first vehicle control apparatus.

10. A vehicle control system according to claim 1 wherein said control circuit means stores predetermined initial values beforehand as data in said storage medium, for use by said first control circuit means in performing control operations, and wherein said first control circuit means utilizes said predetermined initial values in performing said control operations only during said delay interval.

11. A vehicle control system according to claim 1, comprising a wake-up system responsive to detection of a predetermined change in a condition of said vehicle for activating said first vehicle control apparatus.

12. A vehicle control system according to claim 11, wherein said wake-up system is responsive to a switch signal produced by actuation of a door switch of said vehicle for activating said first vehicle control apparatus.

13. A vehicle control system according to claim 11, wherein each of said first vehicle control apparatus and said second vehicle control apparatus is responsive to generation of an ignition signal, resulting from actuation of an ignition switch of said vehicle, for becoming activated to said operative condition.

14. A method of controlling a vehicle comprising a first vehicle control apparatus and a second vehicle control apparatus, the first vehicle control apparatus having (i) a communication circuit that is coupled for data communication with the second vehicle control apparatus, and (ii) a storage medium for storing data received from said second vehicle control apparatus via said communication circuit, the method comprising:
changing the first vehicle control apparatus from an inoperative condition to an operative condition at a first activation time point of the first vehicle control apparatus;
changing the second vehicle control apparatus from an inoperative condition to an operative condition at a second activation time point of the second vehicle control apparatus, the second activation time point being delayed with respect to the first activation time point; and
inhibiting execution of processing that utilizes data stored in the storage medium of the first vehicle control apparatus during a delay interval extending from the first activation time point up to at least the second activation point.

15. A method according to claim 14, wherein the delay interval extends from the first activation time point to a time point of switch-on of a main power supply of said vehicle.

16. A method according to claim 14, wherein the delay interval extends from first activation time point to a time point that succeeds, by a predetermined reference duration, a time point of switch-on of a main power supply of said vehicle.

17. A method of controlling a vehicle comprising a first vehicle control apparatus and a second vehicle control apparatus, the first vehicle control apparatus having (i) a communication circuit that is coupled for data communication with the second vehicle control apparatus, and (ii) a storage medium for storing data received from said second vehicle control apparatus via said communication circuit, the method comprising:
changing the first vehicle control apparatus from an inoperative condition to an operative condition at a first activation time point of the first vehicle control apparatus;
changing the second vehicle control apparatus from an inoperative condition to an operative condition at a second activation time point of the second vehicle control apparatus, the second activation time point being delayed with respect to the first activation time point; and
inhibiting execution of processing that utilizes data stored in the storage medium of the first vehicle control apparatus during a delay interval;
wherein the delay interval extends from the first activation time point to a time point at which data begins to be received from said second vehicle control apparatus via said communication circuit.

18. A method according to claim 17, wherein said second vehicle control apparatus responds to a data transmission request by transmitting data to a source of said data transmission request, and wherein said first vehicle control apparatus repetitively transmits data transmission requests to said second vehicle control apparatus during said delay interval.

19. A method according to claim 14, wherein execution of failure detection processing, that utilizes data stored in said storage medium, is inhibited during said delay interval.

20. A method according to claim 14, wherein said second vehicle control apparatus responds to receiving a data transmission request by transmitting data to a source of said data transmission request, and wherein transmitting of a data transmission request by said first vehicle control apparatus to said second vehicle control apparatus is inhibited during said delay interval.

21. A method according to claim 14, wherein the delay interval extends from the first activation time point until a time point at which said second vehicle control apparatus has changed from an inoperative condition to a condition of being capable of communication with said first vehicle control apparatus.

22. A method according to claim 14 further comprising:
storing predetermined initial values beforehand as data in said storage medium; and
utilizing the predetermined initial values in performing said control operations only during said delay interval.

23. A method according to claim 14, wherein the first activation time point of the first vehicle control apparatus is responsive to detection of a predetermined change in a condition of said vehicle by a wake-up system.

24. A method according to claim 23, wherein said wake-up system is responsive to a switch signal produced by actuation of a door switch of said vehicle.

* * * * *

UNITED STATES PATENT AND TRADEMARK OFFICE
CERTIFICATE OF CORRECTION

| | | |
|---|---|---|
| PATENT NO. | : 8,164,214 B2 | |
| APPLICATION NO. | : 11/401301 | |
| DATED | : April 24, 2012 | |
| INVENTOR(S) | : Katsuyuki Ando | |

It is certified that error appears in the above-identified patent and that said Letters Patent is hereby corrected as shown below:

Title page, illustrative figure should be deleted and substitute therefore the attached title page consisting of illustrative fig. 1.

In the Drawings

The drawing sheets 1-2 consisting of fig(s) 1-3 should be deleted and substitute therefore the attached drawing sheets 1-2 consisting of Fig(s) 1-3.

Signed and Sealed this
Thirtieth Day of October, 2012

David J. Kappos
*Director of the United States Patent and Trademark Office*

(12) United States Patent
Ando (10) Patent No.: US 8,164,214 B2
(45) Date of Patent: Apr. 24, 2012

(54) VEHICLE CONTROL APPARATUS HAVING FUNCTION FOR PREVENTING ERRONEOUS OPERATION DUE TO DELAY IN ACTIVATION OF OTHER VEHICLE CONTROL APPARATUS

(75) Inventor: Katsuyuki Ando, Kasugai (JP)

(73) Assignee: Denso Corporation, Kariya (JP)

(*) Notice: Subject to any disclaimer, the term of this patent is extended or adjusted under 35 U.S.C. 154(b) by 1123 days.

(21) Appl. No.: 11/401,301

(22) Filed: Apr. 11, 2006

(65) Prior Publication Data
US 2006/0226702 A1   Oct. 12, 2006

(30) Foreign Application Priority Data
Apr. 11, 2005   (JP) ................. 2005-113390

(51) Int. Cl.
*B60L 1/00* (2006.01)
*B60L 3/00* (2006.01)
*H02G 3/00* (2006.01)

(52) U.S. Cl. ........................................ 307/9.1
(58) Field of Classification Search ............. 307/9.1, 307/10.1
See application file for complete search history.

(56) References Cited

U.S. PATENT DOCUMENTS

| | | | |
|---|---|---|---|
| 5,467,277 A | 11/1995 | Fujisawa et al. | |
| 5,587,957 A | 12/1996 | Kowalczyk et al. | |
| 5,629,941 A | 5/1997 | Kawanishi et al. | |
| 5,739,761 A * | 4/1998 | Kobayashi | 701/35 |
| 6,459,967 B1 | 10/2002 | Otto | |
| 6,662,094 B2 * | 12/2003 | Murphy et al. | 701/45 |
| 2005/0210326 A1 | 9/2005 | Nishimura et al. | |

FOREIGN PATENT DOCUMENTS

| | | |
|---|---|---|
| DE | 198 39 193 A1 | 3/2000 |
| EP | 0272877 A2 | 12/1987 |
| EP | 0272877 A3 | 12/1987 |
| EP | 0911220 A2 | 10/1998 |
| JP | 6-30005 | 2/1994 |
| JP | 6-135101 | 5/1994 |
| JP | 07-226980 | 8/1995 |
| JP | 08-008924 | 1/1996 |
| JP | 08-276800 | 10/1996 |
| JP | 10-63542 | 3/1998 |
| JP | 2002-314632 | 10/2002 |
| JP | 2004-104253 | 4/2004 |
| JP | 2005-250854 | 9/2005 |

OTHER PUBLICATIONS

Extended EPO Search Report dated May 31, 2007.
Office Action dated Apr. 6, 2010 issued in corresponding Japanese Application No. 2005-113390 with an at least partial English-language translation thereof.

* cited by examiner

*Primary Examiner* — Jared Fureman
*Assistant Examiner* — Carlos Amaya
(74) *Attorney, Agent, or Firm* — Nixon & Vanderhye P.C.

(57) ABSTRACT

In a control system in which a first vehicle control apparatus becomes activated prior to activation of a second vehicle control apparatus, and is coupled for communication with the second vehicle control apparatus and has a storage medium for storing data received from the second vehicle control apparatus, the first vehicle control apparatus inhibits processing using data stored in the storage medium, during a delay interval that precedes activation of the second vehicle control apparatus.

24 Claims, 3 Drawing Sheets